(12) United States Patent
Imanishi et al.

(10) Patent No.: US 8,663,862 B2
(45) Date of Patent: Mar. 4, 2014

(54) FUEL CELL SYSTEM

(75) Inventors: Hiroyuki Imanishi, Toyota (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/446,787

(22) Filed: Apr. 13, 2012

(65) Prior Publication Data

US 2012/0306292 A1  Dec. 6, 2012

Related U.S. Application Data

(63) Continuation of application No. PCT/JP2011/062358, filed on May 30, 2011.

(51) Int. Cl.
*H01M 8/04* (2006.01)

(52) U.S. Cl.
USPC ........... 429/432; 429/400; 429/428; 429/429; 429/430; 429/431

(58) Field of Classification Search
USPC ......... 429/400, 429, 432, 434, 428, 430, 431; 363/16
See application file for complete search history.

(56) References Cited

U.S. PATENT DOCUMENTS

| 8,111,056 B2 * | 2/2012 | Manabe et al. ............... 323/272 |
| 2009/0316741 A1 * | 12/2009 | Watanabe ....................... 372/34 |

FOREIGN PATENT DOCUMENTS

| JP | 2003-178785 A | 6/2003 |
| JP | 2006-230078 A | 8/2006 |
| JP | 2006-288024 A | 10/2006 |
| JP | 2007-43888 A | 2/2007 |
| JP | 2010-279135 A | 12/2010 |
| WO | WO2008/047616 | * 4/2008 |
| WO | 2010/140228 A1 | 12/2010 |

* cited by examiner

*Primary Examiner* — Patrick Ryan
*Assistant Examiner* — Alex Usyatinsky
(74) *Attorney, Agent, or Firm* — Kenyon & Kenyon LLP

(57) ABSTRACT

An FC voltage increasing converter includes a plurality of converter parts having reactors. Regarding the first of the plurality of converter parts provided with a thermistor, the output starts to be limited when the temperature detected by the thermistor reaches a limitation starting temperature, which is obtained based on a reference heat-resistant temperature, which is obtained by subtracting an error of the thermistor from a specification heat-resistant temperature of each of the reactors. Meanwhile, regarding the second, third and fourth of the plurality of converter parts not provided with thermistors, the outputs start to be limited when the temperature detected by the thermistor reaches a limitation starting temperature obtained based on an allowable temperature, which is obtained by subtracting a characteristic-variation temperature of the reactor from the reference heat-resistant temperature of the reactor.

5 Claims, 3 Drawing Sheets

FUEL CELL SYSTEM

This is a Continuation of International Application No. PCT/JP2011/062358 filed on May 30, 2011. The entire disclosure of the prior application[s] is hereby incorporated by reference herein in its entirety.

TECHNICAL FIELD

The present invention relates to a fuel cell system provided with a fuel cell and a plurality of voltage converters.

BACKGROUND ART

For example, a vehicle provided with an electric motor is known which comprises: a voltage converter that converts the voltage generated by a power generation apparatus to charge a DC power supply and supplies the converted voltage to an auxiliary apparatus connected in parallel to the DC power supply; and a control apparatus that controls the auxiliary apparatus to limit the load of the auxiliary apparatus when the flowing current of the voltage converter exceeds a predetermined value (see, for example, Patent Document 1).

Patent Document 1: JP2006-288024 A

DISCLOSURE OF THE INVENTION

Problem to be Solved by the Invention

In the system as described above, a large current flows through a reactor of a voltage increasing converter being a voltage converter, and therefore, a thermistor is provided to carry out controls such that the reactor does not reach too high a temperature.

In recent years, due to the increase in output of a fuel cell, a multiphase converter, which is a polyphase converter with a plurality of reactors, is sometimes used as a voltage increasing converter being a voltage converter. In such a multiphase converter, controlling the temperatures of the reactors of the respective phases by means of the thermistors provided for the respective phases increases the number of thermistors provided, resulting in the cost increase.

In such a case, it can be considered that a thermistor is provided for a certain phase and this thermistor controls the temperatures of the reactors of all the phases. However, in this case, characteristic variations, measurement errors of the thermistor, and load factor limitations set in terms of drivability (driving comfort) need to be taken into consideration, leading to redundant control. Therefore, the temperatures of the reactors need to be controlled so as to be kept much lower than the actual heat-resistant temperature, which indicates inefficient control.

The present invention has been made in light of the above circumstances, and an object of the present invention is to provide a fuel cell system that is capable of attaining increased efficiency while suppressing the cost.

Means for Solving the Problem

In order to achieve the above object, the present invention provides a fuel cell system comprising: a fuel cell that generates electric power through an electrochemical reaction between a fuel gas and an oxidant gas; a voltage increasing converter that increases a voltage of the electric power from the fuel cell; and a control unit that controls an output of the voltage increasing converter, the voltage increasing converter comprising a plurality of converter parts respectively having reactors, a part of the converter parts being provided with a temperature sensor that detects a temperature of the reactor, the control unit being capable of limiting outputs of the converter parts at a predetermined rate of change, wherein the control unit makes limitation starting temperatures of the outputs different between the converter part provided with the temperature sensor and the converter part not provided with the temperature sensor.

More specifically, regarding the converter part provided with the temperature sensor, the output starts to be limited when the temperature detected by the temperature sensor reaches a limitation starting temperature obtained based on the heat-resistant temperature of the reactor, while regarding the converter part not provided with the temperature sensor, the output starts to be limited when the temperature detected by the temperature sensor reaches a limitation starting temperature obtained based on an allowable temperature obtained by subtracting the characteristic-variation temperature of the reactor from the heat-resistant temperature of the reactor.

With the fuel cell system having such a configuration, the multiphase voltage increasing converter having the converter parts can deal with the increase in current of the fuel cell; further, the outputs of the converter parts are controlled with the temperature sensor being provided to the part of the converter parts, and thus the cost can be reduced significantly compared with the case where all the converter parts are provided with temperature sensors. Moreover, the limitation starting temperature obtained through the subtraction of the characteristic-variation temperature of the reactor is set only for the converter part not provided with the temperature sensor, and thus all the limitation star temperatures can be raised. As a result, each of the reactors can be driven with performance close to the limit of the performance of the reactor which is possible to be exerted originally, which can attain increased efficiency. Furthermore, the need of an excessive radiating structure or heat-resistant structure for the reactors can be eliminated, which can further cut down costs.

Further, in the fuel cell system of the present invention, a rate of change of the output limitation for the converter part provided with the temperature sensor may be set lower than a rate of change of the output limitation for the converter part not provided with the temperature sensor.

Further, in the fuel cell system of the present invention, a time when the output limitation for the converter part is cancelled may be slightly offset to a low temperature side with respect to the output limitation.

Further, in the fuel cell system of the present invention, the voltage increasing converter may be configured such that the number of drive phases is capable of being switched to increase the number of driven converter parts with an increase of the output of the voltage increasing converter and that the temperature sensor is provided to the converter part of the first drive phase.

Further, in the fuel cell system of the present invention, the control unit may determine the variation temperature based on predetermined heating characteristics of the reactors of the converter parts.

Effect of the Invention

According to the fuel cell system of the present invention, increased efficiency can be attained while suppressing the cost.

DESCRIPTION OF SYMBOLS

Figure 1:
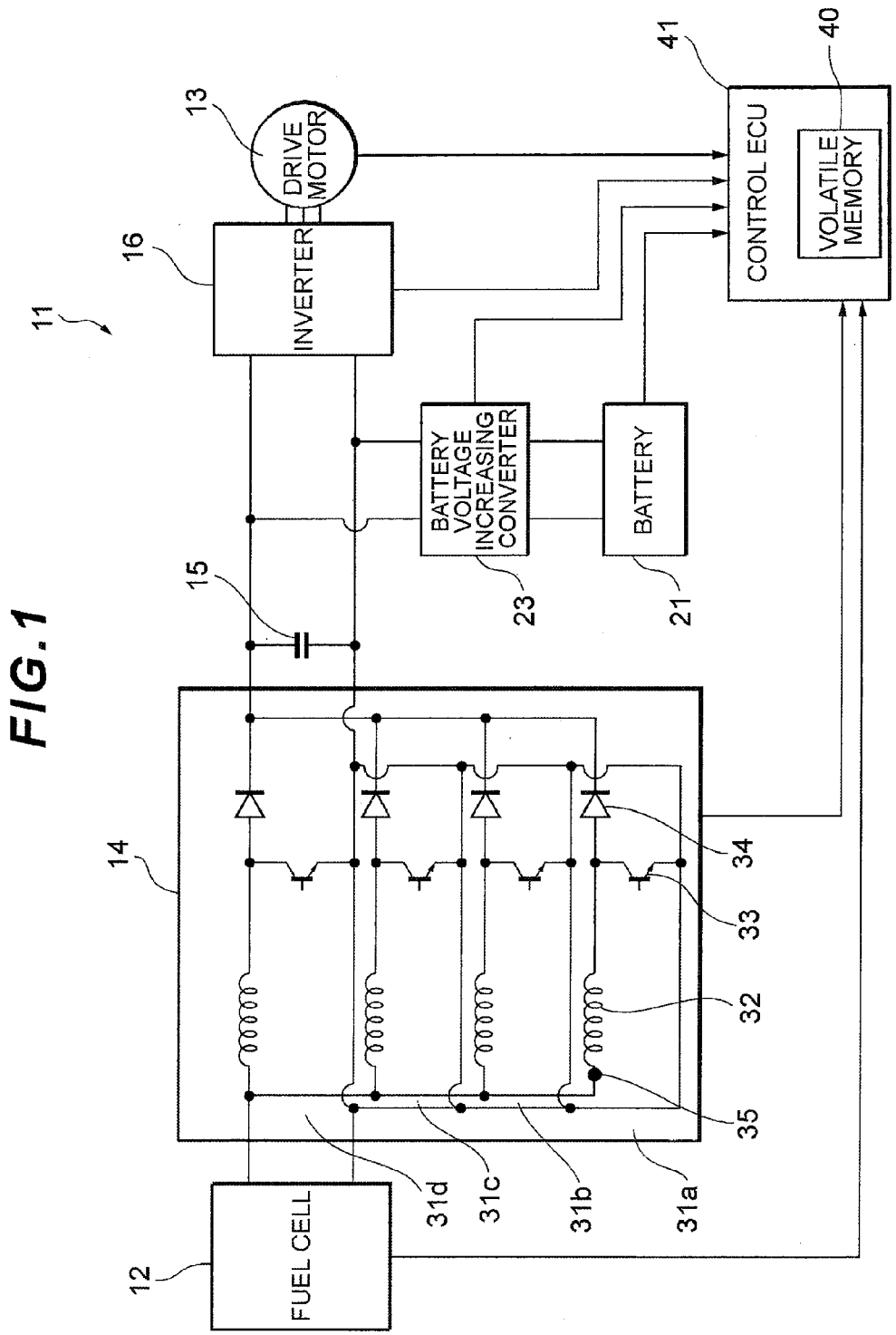
FIG. 1 is a schematic circuit diagram of a fuel cell system according to an embodiment of the invention.

11: fuel cell system
12: fuel cell
13: drive motor
14: FC voltage increasing converter (voltage increasing converter)
31a-31d: converter parts
32: reactor
35: thermistor (temperature sensor)
41: ECU (control unit)
Ta: reference heat-resistant temperature (heat-resistant temperature)
Tb': allowable temperature
Tc', Tc'': limitation starting temperature
tc: variation temperature

BEST MODE FOR CARRYING OUT THE INVENTION

An embodiment of a fuel cell system according to the present invention will be described below with reference to the attached drawings. The embodiment will describe an example where the fuel cell system according to the invention is used as an in-vehicle power generation system for a fuel cell hybrid vehicle (FCHV).

The configuration of the fuel cell system according to the embodiment will be described with reference to FIG. 1.

As shown in FIG. 1, a fuel cell system 11 includes a fuel cell 12 that generates electric power through an electrochemical reaction between an oxidant gas and a fuel gas serving as reactant gasses.

The fuel cell 12 is, for example, a polymer electrolyte type fuel cell, which has a stack structure with a lot of unit cells stacked therein. Each unit cell has an air electrode on one surface of an electrolyte constituted by an ion-exchange membrane and a fuel electrode on the other surface of the electrolyte, and the unit cell further has a pair of separators that sandwich the air electrode and the fuel electrode therebetween. In this configuration, hydrogen gas is supplied to a hydrogen gas flow path of one separator while air serving as the oxidant gas is supplied to an oxidant gas flow path of the other separator, and electric power is generated through a chemical reaction between these reactant gasses.

The fuel cell 12 is connected to a drive motor (drive source, load) 13 for running a vehicle, and supplies power to the drive motor 13. An FC voltage increasing converter (voltage increasing converter) 14, a capacitor 15 and a drive inverter 16 are connected, in the order beginning from the fuel cell 12 side, to the power supply path from the fuel cell 12 to the drive motor 13.

As described above, in the fuel cell system 11, the voltage of the power generated from the fuel cell 12 is increased by the FC voltage increasing converter 14, and the resultant power is supplied to the drive motor 13 via the drive inverter 16.

The FC voltage increasing converter 14 is a multiphase converter being a converter with multiple phases, and is provided with a plurality of converter parts 31a to 31d (for converters in this embodiment). Each of the converter parts 31a to 31d is provided with a reactor 32, a transistor 33 and a diode 34, and the converter part 31a is provided with a thermistor (temperature sensor) 35.

The drive motor 13 is, for example, a three-phase alternating current motor, and the drive inverter 16, to which the drive motor 13 is connected, converts a direct current to a three-phase alternating current, and supplies the three-phase alternating current to the drive motor 13.

Further, the fuel cell system 11 is provided with a battery 21 that supplies power to the drive motor 13. A battery voltage increasing converter 23 is connected to the power supply path from the battery 21 to the drive motor 13. The fuel cell system according to the invention may not be provided with the battery voltage increasing converter 23.

The power supply path of the battery 21 is connected to the power supply path of the fuel cell 12, and the power from the battery 21 can be supplied to the drive motor 13.

The battery voltage increasing converter 23 in this embodiment is a direct-current voltage converter, which has: a function of regulating a direct-current voltage input from the battery 21 and outputting the regulated voltage to the drive motor 13; and a function of regulating a direct-current voltage input from the fuel cell 12 or the drive motor 13 and outputting the regulated voltage to the battery 21. Due to these functions of the battery voltage increasing converter 23, the battery 21 can be charged or discharged. Further, the battery voltage increasing converter 23 controls an output voltage of the fuel cell 12. The battery 21 is capable of being charged with surplus power and supplying electric power in an auxiliary manner.

The fuel cell system 11 includes an ECU (control unit) 41 having a volatile memory 40. The fuel cell 12, the FC voltage increasing converter 14, the battery 21, the battery voltage increasing converter 23, the drive inverter 16 and the drive motor 13 are connected to the ECU 41, and the ECU 41 controls the fuel cell 12, the FC voltage increasing converter 14, the battery 21, the battery voltage increasing converter 23, the drive inverter 16 and the drive motor 13. Further, a signal of temperature detected by the thermistor 35 provided to the converter part 31a of the FC voltage increasing converter 14 is transmitted to the ECU 41. The ECU 41 then controls outputs of the converter parts 31a to 31d, which constitute the FC voltage increasing converter 14, based on the temperature detected by the thermistor 35 of the converter part 31a.

Control over the converter parts 31a to 31d which is performed by the ECU 41 will be described. Note that control over the voltage increasing converter which is performed by the control unit of the fuel cell system according to the invention includes at least control over the output of the voltage increasing converter and control over switching of the number of converter parts driven, i.e., control over switching of the number of drive phases of the voltage increasing converter.

First, control according to reference examples will be described.

Reference Example 1

Description will be made regarding a case where the converter parts 31a to 31d are respectively provided with thermistors 35, and are controlled by the thermistors 35.

Figure 2:
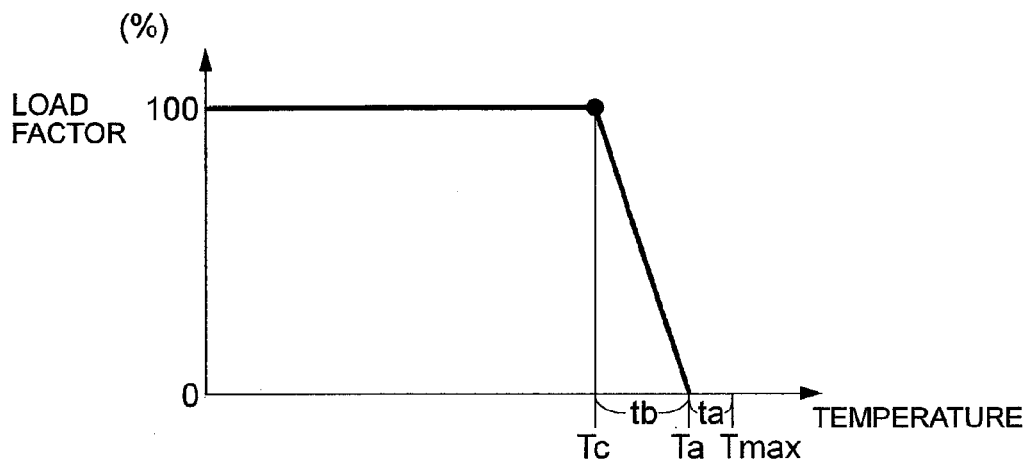
FIG. 2 is a graph showing the relationship between the temperature and the load factor of a reactor in reference example 1.

As shown in FIG. 2, the ECU 41 controls the outputs of the converter parts 31a to 31d at load factors (also referred to as the load limitation factors) defined based on the outputs of the converter parts 31a to 31d actually driven with respect to the outputs as of when all the converter parts 31a to 31d are driven such that the temperature of each of the reactors 32 does not exceed a reference heat-resistant temperature Ta, which is obtained by subtracting an error ta of each of the thermistors 35 from a specification heat-resistant temperature Tmax of the reactor 32. Note that, as to this error ta, the maximum error value possible as a measurement error of the thermistor 35 relative to an actual temperature is set, and for example, the value shown in the design specification, etc., of the thermistor 35 is employed as the error ta.

If the outputs of the converter parts 31a to 31d are stopped with the premise that the load factor of each of the reactors 32 is 0 when the reactor 32 reaches the reference heat-resistant temperature Ta, the stopping of the outputs of the converter parts 31a to 31d results in the stopping of a vehicle. Therefore, the ECU 41 starts limiting the load factor of the reactor 32 before the reactor 32 reaches the reference heat-resistant temperature Ta so as to gradually lower the outputs of the converter parts 31a to 31d. A rate of change of output based on the load factor limitation is set based on drivability serving as an index of driving comfort, and this limitation is performed at, for example, a rate of 10%/° C. The rate of change is made smaller than the above rate in order to ensure more satisfactory drivability; meanwhile, if the change of rate is greater than the above rate, drivability is relatively reduced.

When the outputs of the converter parts 31a to 31d are controlled, a temperature change tb during the transition of the load factor of the reactor 32 from 100% to 0% is considered.

That is, when the load factors are controlled with all the converter parts 31a to 31d being provided with the thermistors 35, the outputs of the converter parts 31a to 31d start to be limited at a limitation starting temperature Tc, which is obtained by subtracting the temperature change tb based on the load factor limitation for drivability from the reference heat-resistant temperature Ta, which is obtained by subtracting the error ta of each of the thermistors 35 from the specification heat-resistant temperature Tmax.

For example, assuming that the specification heat-resistant temperature Tmax of the reactor 32 is 170° C. and the error ta of the thermistor 35 is 7° C., the reference heat-resistant temperature Ta is 163° C. Further, assuming that the rate of change based on the load factor limitation for drivability is 10%/° C., the temperature change tb based on the load factor limitation is 10° C. (=100%/10%/° C.), and thus the limitation starting temperature Tc (Tc=Ta−tb) is 153° C.

However, the above-described system, in which the thermistors 35 are provided to all the converter parts 31a to 31d to control the outputs of the converter parts 31a to 31d, results in an increase in costs.

Reference Example 2

Next, typical control with the thermistor 35 provided to the converter part 31a will be described.

Figure 3:
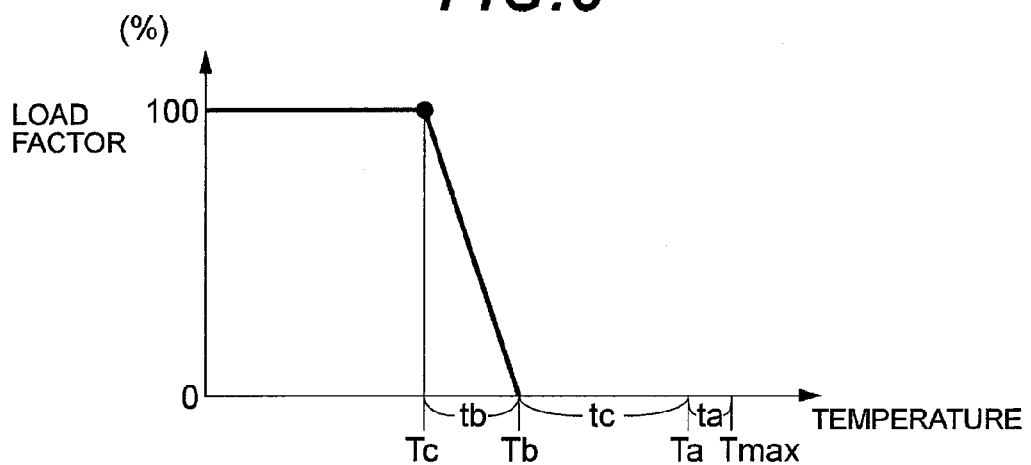
FIG. 3 is a graph showing the relationship between the temperature and the load factor of a reactor in reference example 2.

In this case as well, the ECU 41 controls the outputs that serve as the load factors such that the temperature of each of the reactors 32 does not exceed the reference heat-resistant temperature Ta, which is obtained by subtracting the error ta of the thermistor 35 from the specification heat-resistant temperature Tmax of the reactor 32, as shown in FIG. 3.

Here, the reactors 32 vary in heat-resistant temperature due to the variation in characteristics such as heating characteristics. Thus, regarding each of the reactors 32 of the converter parts 31b to 31d, which are not provided with thermistors 35, a variation temperature tc for the specification heat-resistant temperature Tmax of the reactor 32 is considered with respect to the temperature detected by the thermistor 35 that detects the temperature of the reactor 32 of the converter part 31a.

Considering the temperature tc, the output control needs to be performed such that the temperature of the reactor 32 does not exceed an allowable temperature Tb, which is obtained by subtracting the temperature tc of the reactor 32 from the reference heat-resistant temperature Ta, which is obtained by subtracting the error ta of the thermistor 35 from the specification heat-resistant temperature Tmax. The limitation starting temperature Tc is then the temperature obtained by subtracting the temperature change tb based on the load factor limitation for drivability from the allowable temperature Tb.

For example, assuming that: the specification heat-resistant temperature Tmax of the reactor 32 is 170° C.; the error ta of the thermistor 35 is 7° C.; and the temperature tc is 20° C., the allowable temperature Tb is 143° C. Further, assuming that the rate of change based on the load factor limitation for drivability is 10%/° C., the temperature change tb based on the load factor limitation is 10° C. (=100%/10%/° C.), and thus the limitation starting temperature Tc (Tc=Tb−tb) is 133° C.

Accordingly, this control can cut down the cost with a reduction of the number of thermistors 35, but requires the limitation starting temperature Tc of each of the reactors 32 of the converter parts 31a to 31d to be set to a temperature much lower than the actual specification heat-resistant temperature Tmax, leading to inefficient control.

The control according to this embodiment will then be described.

As with reference example 2 above, this embodiment employs control with the thermistor 35 provided only to the converter part 31a.

Figure 4:
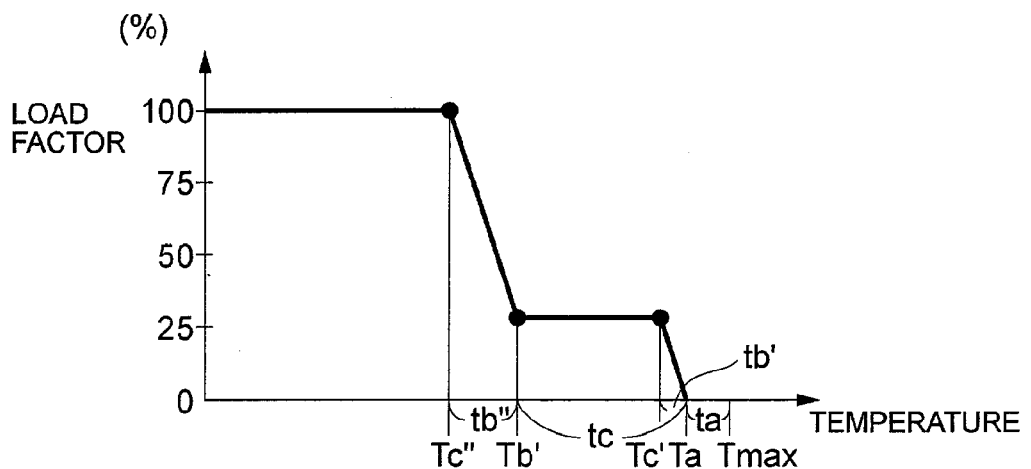
FIG. 4 is a graph showing the relationship between the temperature and the load factor of a rector in a first embodiment.

As shown in FIG. 4, first, regarding the reactor 32 of the converter part 31a provided with the thermistor 35, the reference heat-resistant temperature Ta, which is obtained by subtracting the error ta of the thermistor 35 from the specification heat-resistant temperature Tmax, is calculated. A limitation starting temperature Tc' is then obtained by subtracting a temperature change tb' based on the load factor limitation for drivability from the reference heat-resistant temperature Ta.

For example, assuming that the specification heat-resistant temperature Tmax of the reactor 32 is 170° C. and the error ta of the thermistor 35 is 7° C., the reference heat-resistant temperature Ta of the reactor 32 of the converter part 31a is 163° C. Further, assuming that the rate of change based on the load factor limitation for drivability is 10%/° C., the temperature change tb' based on the load factor limitation is 2.5° C. (=25% (corresponding to 1 phase)/10%/° C.), and thus the limitation starting temperature Tc' (Tc'=Ta−tb') of the reactor 32 of the converter part 31a is 160.5° C.

Regarding each of the converter parts 31b to 31d not provided with thermistors 35, they need to be controlled such that the temperature of the reactor 32 does not exceed an allowable temperature Tb', which is obtained by subtracting the temperature tc of the reactor 32 from the reference heat-resistant temperature Ta, which is obtained by subtracting the error ta of the thermistor 35 from the specification heat-resistant temperature Tmax. A limitation starting temperature Tc" for the converter parts 31b to 31d is then the temperature obtained by subtracting a temperature change tb" based on the load factor limitation for drivability from the allowable temperature Tb'. Here, the temperature change tb" based on the load factor limitation corresponds to 3 phases (i.e. 75%) excluding the converter part 31a, and thus is smaller than the temperature change tb based on the load factor limitation in reference example 2.

For example, assuming that the specification heat-resistant temperature Tmax of the reactor 32 is 170° C., the error to of the thermistor 35 is 7° C., and the temperature tc is 20° C., the allowable temperature Tb' of each of the reactors 32 of the converter parts 31b to 31d is 143° C. Further, assuming that the rate of change of the load factor limitation for drivability is 10%/° C. with the premise that the same current flows through the converter parts 31b to 31d, the temperature change tb" corresponding to the rate of change of 75% based on the load factor limitation is 7.5° C. (=75%/10%/° C.), and thus the limitation starting temperature Tc" (Tc"=Tb'−tb") is 135.5° C.

Accordingly, for the converters other than the converter part 31a, the converter parts 31b to 31d, the limitation starting temperature Tc" can be set to be high compared with reference example 2.

As described above, the fuel cell system according to the above embodiment can deal with the increase in current of the output of the fuel cell using the FC voltage increasing converter 14 having the converter parts 31a to 31d. Further, the outputs of the converters 31a to 31d are controlled with the thermistor 35 being provided to one of the converter parts 31a to 31d, and therefore, the cost can be reduced significantly compared with the case where all the converter parts 31a to 31d are provided with thermistors 35. Moreover, the limitation starting temperature Tc", which is obtained through the subtraction of the characteristic-variation temperature tc of the reactor 32 is set only for the converter parts 31b to 31d not provided with thermistors 35, and thus all the limitation starting temperatures can be raised. As a result, each of the reactors 32 can be driven with performance close to the limit of the performance of the reactor 32 which is possible to be exerted originally, which can attain increased efficiency. Furthermore, the need of an excessive radiating structure or heat-resistant structure can be eliminated, which can further cut down costs.

Figure 5:
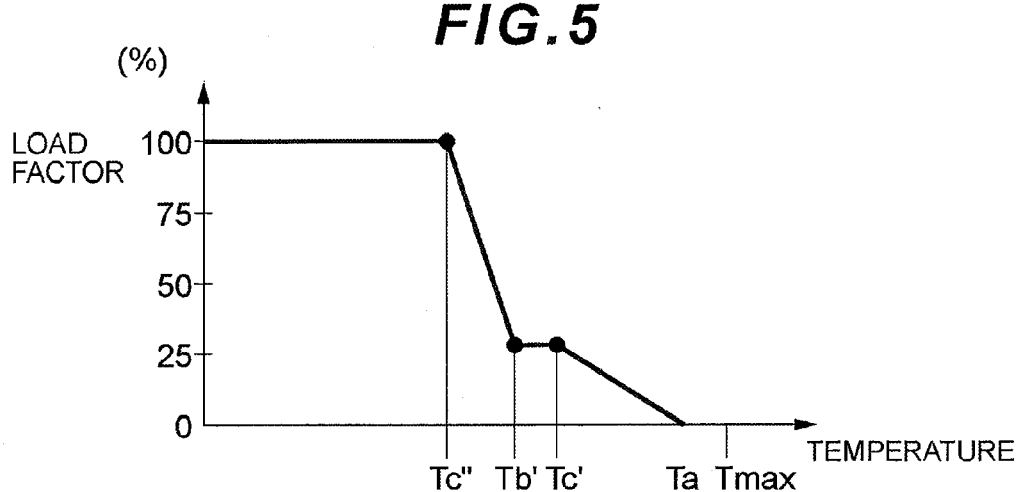
FIG. 5 is a graph showing the relationship between the temperature and the load factor of a reactor in another embodiment.

After the outputs of the converter parts 31b to 31d not provided with thermistors 35 are controlled when the limitation starting temperature Tc" is reached, and the outputs of the converter parts 31b to 31d then become zero, only the converter part 31a provided with the thermistor 35 produces the output, which indicates the state where the entire output is significantly reduced. In light of this, the rate of change based on the load factor limitation of the converter parts 31b to 31d may be set to be as large as possible without impairing the drivability so as to raise the limitation starting temperature Tc", while for the converter part 31, the load factor limitation may be set with the top priority being put on drivability. In such a case, the limitation starting temperature Tc' is set low for the converter part 31a, thereby attaining a mild rate of change of the load factor limitation, as shown in FIG. 5.

Further, one converter part, the converter part 31a is provided with the thermistor 35 in the above embodiment; however, the two converter parts 31a and 31b or the three converter parts 31a to 31c may be provided with thermistors 35. The point is that in the fuel cell system according to the invention, as long as the number of phases of the voltage increasing converter is N (N: integer), the number of thermistors can be any value ranging from 1 to N−1.

Here, when the two converter parts 31a and 31b are provided with thermistors 35, the limitation starting temperature Tc" for the converter parts 31c and 31d not provided with thermistors 35 is the temperature obtained by subtracting the temperature change tb" based on the load factor limitation for two phases from the allowable temperature Tb'. Assuming that the specification heat-resistant temperature Tmax of the reactor 32 is 170° C., the error ta of the thermistor 35 is 7° C., and the temperature tc is 20° C., the allowable temperature Tb' of each of the reactors 32 of the converter parts 31c and 31d is 143° C. Further, assuming that the rate of change of the load factor limitation for drivability is 10%/° C., the temperature change tb" corresponding to the rate of change of 50% based on the load factor limitation is 5° C. (=50%/10%/° C.), and thus the limitation starting temperature Tc" (Tc"=Ta'−tb") is 138° C.

When the three converter parts 31a to 31c are provided with thermistors 35, the limitation starting temperature Tc" of the converter part 31d having no thermistor 35 is the temperature obtained by subtracting the temperature change tb" based on the load factor limitation for one phase from the allowable temperature Tb'. Assuming that the specification heat-resistant temperature Tmax of the reactor 32 is 170° C., the error ta of the thermistor 35 is 7° C., and the temperature tc is 20° C., the allowable temperature Tb' of the reactor 32 of the converter part 31d is 143° C. Further, assuming that the rate of change of the load factor limitation for drivability is 10%/° C., the temperature change tb" corresponding to the rate of change of 25% based on the load factor limitation is 2.5° C. (=25%/10%/° C.), and thus the limitation starting temperature Tc" (Tc"=Tb'−tb") is 140.5° C.

Figure 6:
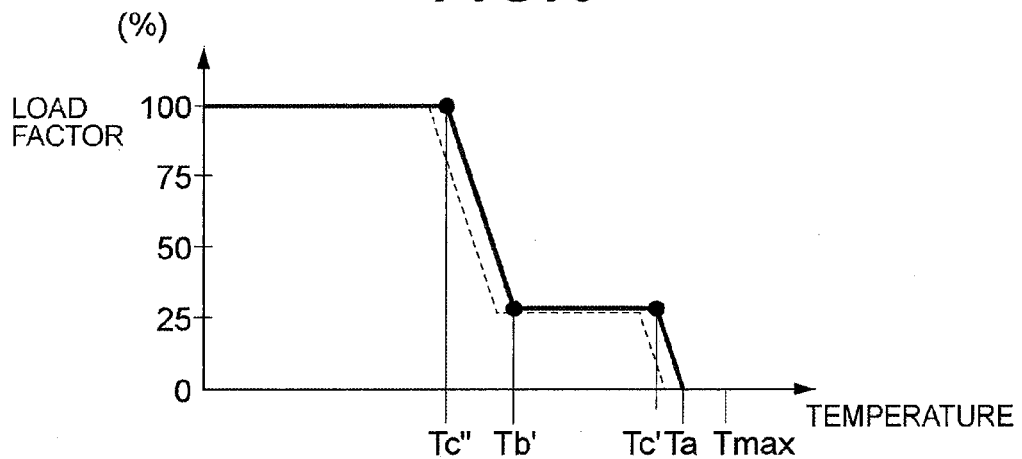
FIG. 6 is a graph showing the relationship between the temperature and the load factor of a reactor in still another embodiment.

Further, regarding the time when the output limitation is cancelled, it is preferable that the solid line is offset to the low temperature side by several degrees (for example, about 3° C.), as shown in FIG. 6 (see the dashed line in FIG. 6). Hysteresis is introduced between the start and the cancellation of the output limitation as described above, whereby the hunting of the control can be suppressed.

Figure 7:
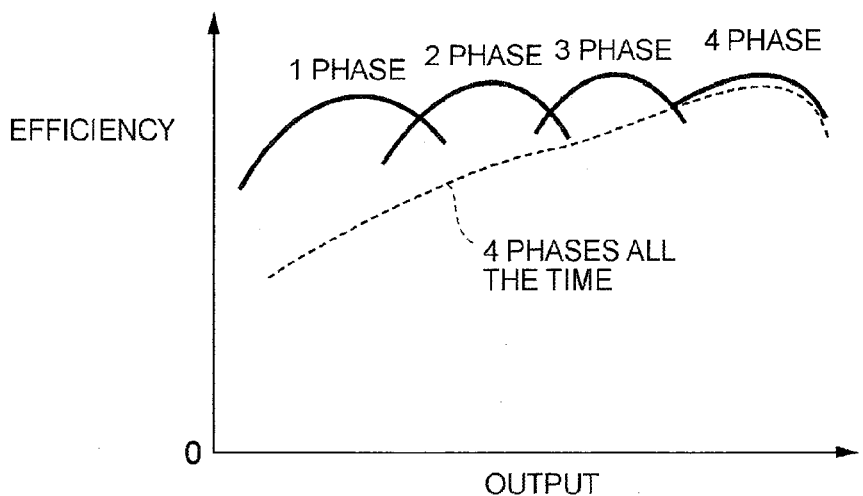
FIG. 7 is a graph showing the general relationship between the output and the efficiency in a multiphase converter.

FIG. 7 shows the relationship between the output and the efficiency in a multiphase converter. In the multiphase converter being a converter with multiple phases, the entire efficiency can be increased more in the case where the number of drive phases is switched so as to increase the number one by one as the output is increased, as shown by the solid lines in FIG. 7, than in the case where the converter parts 31a to 31d for plural phases are always driven, as shown by the broken line in FIG. 7. In the above case of carrying out drive control in which the number of drive phases is switched, the temperature of the converter part of the first drive phase is the highest. Accordingly, the safety in terms of heat resistance can be enhanced by providing the converter part of the first drive phase with the thermistor 35.

Further, the heating characteristics of the respective reactors 32 of the converter parts 31a to 31d may be measured during a delivery inspection, etc., the map of the heating characteristics may be stored in the volatile memory 40 of the ECU 41, and the temperature tc of each of the reactors 32 is determined based on the map to control the output of each of the converter parts 31a to 31d. This can reduce the temperature tc of the reactors 32, whereby the limitation starting temperature Tc" is raised to attain the improvement of efficiency. Note that the heating characteristics of the reactor 32 include direct-current resistance values concerning heat generation of coils, alternating-current resistance values concerning core loss, current loss characteristic concerning cooling performance, etc.

Although the above embodiment has described the configuration in which the fuel cell system according to the invention is provided in a fuel cell hybrid vehicle, the fuel cell system according to the invention may be applied to various mobile objects (e.g., electric vehicles, hybrid vehicles, robots, ships and airplanes) other than fuel cell hybrid vehicles. In addition, the fuel cell system according to the invention may also be applied to stationary power generation systems used as power generating equipment for structures (e.g., houses and building).

What is claimed is:

1. A fuel cell system comprising:
a fuel cell that generates electric power through an electrochemical reaction between a fuel gas and an oxidant gas;
a voltage increasing converter that increases a voltage of the electric power from the fuel cell; and
a control unit programmed to control an output of the voltage increasing converter;
wherein the voltage increasing converter further comprises a plurality of converter parts each having a reactor;
wherein at least one of the plurality of converter parts has a temperature sensor that detects a temperature of a reactor of the at least one of the plurality of converter parts;
wherein at least one of the plurality of converter parts does not have a temperature sensor;
wherein the control unit is further programmed to limit outputs of the converter parts at a predetermined rate of change;
wherein the control unit is further programmed to start limiting the output of the at least one of the plurality of converter parts with the temperature sensor when the temperature detected by the temperature sensor reaches a limitation starting temperature obtained based on a heat-resistant temperature of the reactor; and
wherein the control unit is further programmed to start limiting the output of the at least one of the plurality of converter parts without a temperature sensor when the temperature detected by the temperature sensor reaches a limitation starting temperature obtained based on an allowable temperature obtained by subtracting a characteristic-variation temperature of the reactor from the heat-resistant temperature of the reactor.

2. The fuel cell system according to claim 1, wherein the control unit is further programmed to set a rate of change of the output limitation for the at least one of the plurality of converter parts with the temperature sensor lower than a rate of change of the output limitation for the at least one of the plurality of converter parts without the temperature sensor.

3. The fuel cell system according to claim 1, wherein the control unit is further programmed to offset a time when the output limitation for the converter part is cancelled a low temperature side with respect to the output limitation.

4. The fuel cell system according to claim 1, wherein the voltage increasing converter is programmed such that a number of drive phases is switched to increase a number of driven converter parts with an increase of the output of the voltage increasing converter.

5. The fuel cell system according to claim 1, wherein the control unit is further programmed to determine the characteristic-variation temperature based on predetermined heating characteristics of the reactors of the converter parts.

* * * * *